B. BROWER & J. F. ADAMS, 3 Sheets—Sheet 1

Said ADAMS assignor to said BROWER.

TEMPORARY BINDER.

No. 10,073. Reissued Apr. 4, 1882.

Attest;
Geo. H. Graham
Chas. Teale

Inventors,
B. Brower & J. F. Adams
by Munn & Philipp
Attys.

3 Sheets—Sheet 2.

B. BROWER & J. F. ADAMS,

Said ADAMS assignor to said BROWER.

TEMPORARY BINDER.

No. 10,073. Reissued Apr. 4, 1882.

Attest;
Geo. Graham
C. A. Neal

Inventors,
B. Brower and J. F. Adams,
by Munn & Philipp
Att'ys.

B. BROWER & J. F. ADAMS, 3 Sheets—Sheet 3.
Said ADAMS assignor to said BROWER.
TEMPORARY BINDER.
No. 10,073. Reissued Apr. 4, 1882.
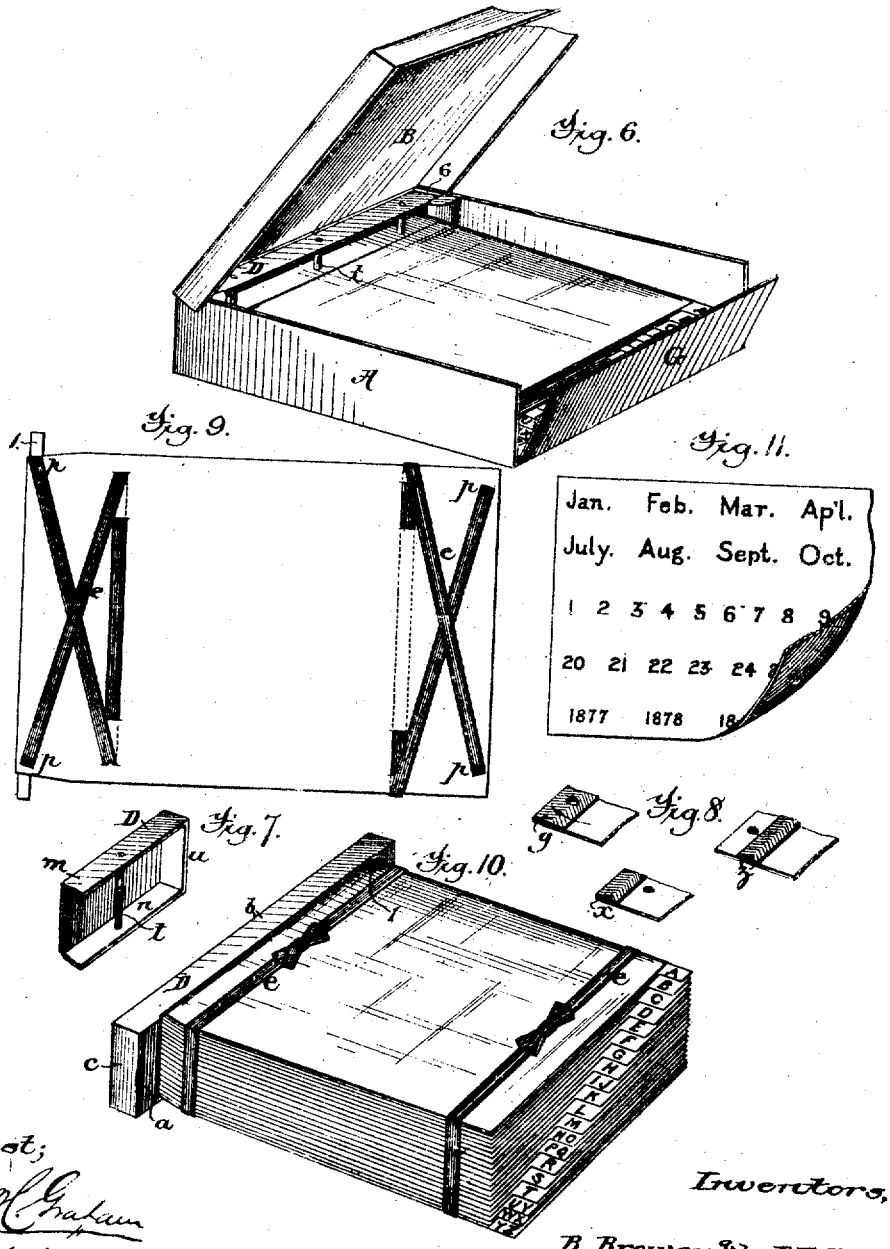
Witness;
Geo. H. Graham
Chas. Neale
Inventors,
B. Brower and J. F. Adams
by Munn & Philipp
Att'ys

UNITED STATES PATENT OFFICE.

BLOOMFIELD BROWER, OF NEW YORK, AND JOHN F. ADAMS, OF IRVINGTON, NEW YORK; SAID ADAMS ASSIGNOR TO SAID BROWER.

TEMPORARY BINDER.

SPECIFICATION forming part of Reissued Letters Patent No. 10,073, dated April 4, 1882.

Original No. 192,109, dated June 19, 1877; Reissue No. 8,277, dated June 11, 1878. Application for reissue filed September 28, 1881.

*To all whom it may concern:*

Be it known that we, BLOOMFIELD BROWER, of the city, county, and State of New York, and JOHN F. ADAMS, of Irvington, county of Westchester and State of New York, have invented certain new and useful Improvements in Letter-Files, of which the following is a full, clear, and exact description.

This invention consists in the combination of a binding-back with a series of adjustable index-leaves that permit the introduction between them of loose sheets, letters, &c., and a box or holder having a bottom, two sides, and a back, provided with grooves to receive and retain the said binding-back in said box or holder, and from which it can be removed vertically, as will be hereinafter more fully explained.

It also consists in a removable binding-back formed with plates connected together, combined with a series of index-leaves, each having affixed to its back edge a plate or rod having projections operating in connection with such plates, as will be hereinafter more fully described and claimed; also, in other combinations of parts, as will be hereinafter fully described and claimed.

Figure 1:
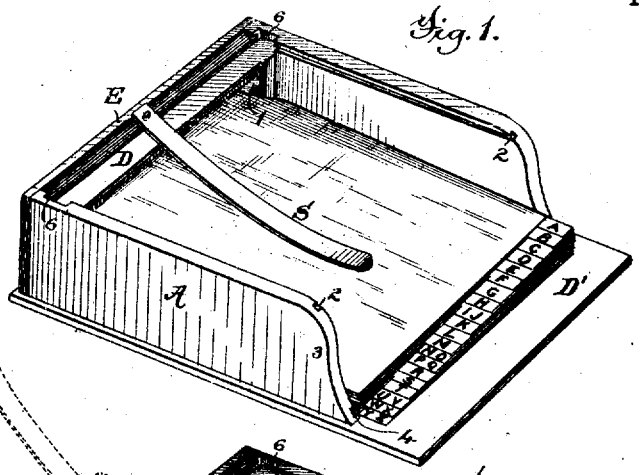
Figure 2:
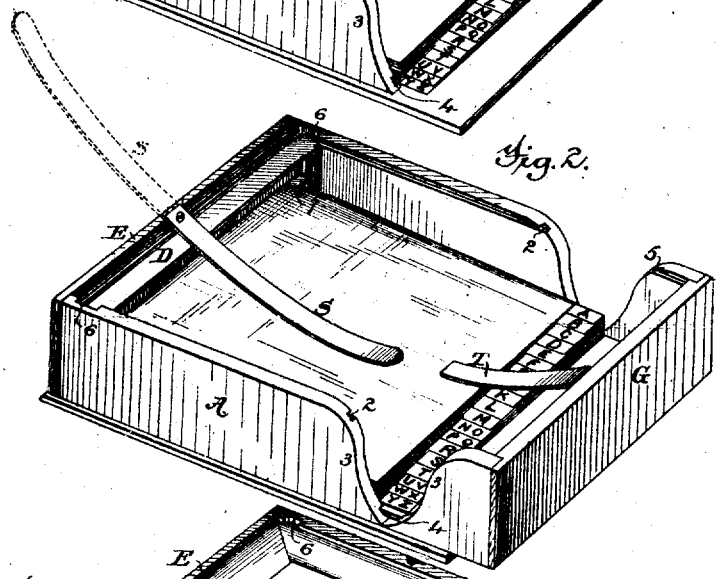
Figure 3:
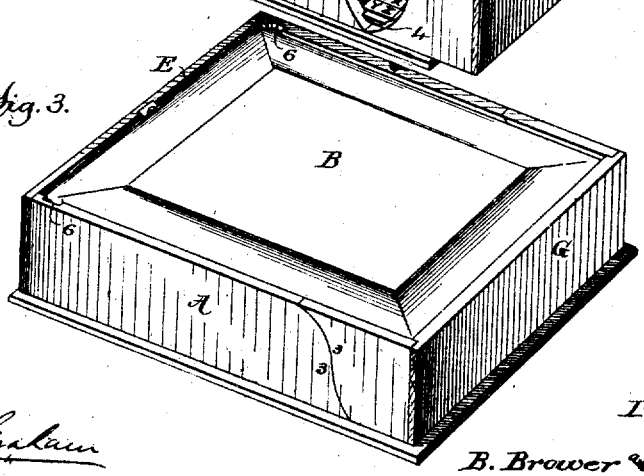
Figure 4:
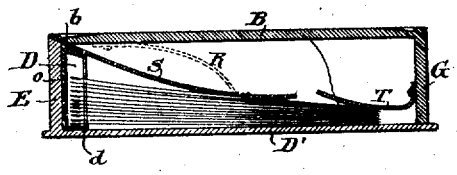
Figure 5:
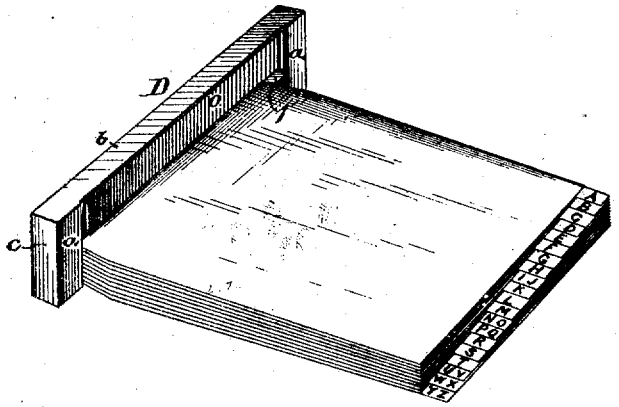

In the drawings, Figure 1 is a perspective view of our letter-file with its cover removed. Fig. 2 is a perspective view of the same with its cover introduced under the index-leaves. Fig. 3 is a perspective view of a letter-file with its cover in a closed position. Fig. 4 is a longitudinal section of the same. Fig. 5 is a perspective view of a binding-back combined with a series of index-leaves. Fig. 6 is a perspective view of a modification of the letter-file shown in the other figures. Fig. 7 is a perspective view of a modification of the binding-back shown in Figs. 1, 2, 4, and 5. Fig. 8 is a perspective view of the index-leaves, showing different modes of strengthening their edges when combined with the binding-back shown in Fig. 7. Fig. 9 is a plan view of one of the index-leaves, showing a binding cord or tape by which a series of index-leaves and their contents may be tied up in a package when removed with their back. Fig. 10 is a perspective view of the series of index-leaves when so tied up in a pack or bundle, and Fig. 11 a plan view of a supplementary index.

In these drawings, A is a box or holder, having a bottom, D′, two sides, curved at their front ends, and a back, E. In the sides of the box are vertical grooves 6, for a purpose to be explained. The sides of this box are also provided with grooves 2 4 at their top and bottom, in which grooves the edges of the cover may slide. This cover has a top plate, B, extended such a distance as to cover the top of the box A when it is slid in the grooves 2, as shown in Fig. 3, and also has an end, G, and sides having grooves 5, the ends of said sides being curved to conform to those of the sides of the box A, as at 3, thus forming a closed box, the bottom D′ of the box being protruded and entering the grooves 5 in the sides of said cover.

D is a binding-back, formed with front plates, *a*, and a plate, *b*, connecting them, these plates being strengthened by end plates, *c c*, bottom plate, *d*, and back plate, *o*. The back plate, *o*, may, instead of extending the width of the binding-back, be quite short, like the plates *a*. As shown in Figs. 1, 2, 4, and 10, each index-leaf has affixed at its back edge a plate or rod having projections 1. These rods or plates may be sprung, so as to permit the projections 1 to pass through the space between the plates *a a* of the binding-back D, when on expanding again said projections 1 will lie behind said plates *a*, in which position they and the index-leaves to which they belong are free to move up and down to accommodate the introduction between said leaves of loose sheets, letters, &c. The binding-back D is of such dimensions as to permit its introduction into the vertical grooves before described. When thus introduced the index-leaves will lie out flat in said holder and rest upon its bottom plate. The said binding-back, with its series of index-leaves combined therewith, may thus be introduced vertically into the box and removed therefrom when desired.

S is a spring, shown in the drawings as pivoted to the upper edge of the back E, adapted to protrude into the box and bear upon the index-leaves and compress them therein and also serving to hold the binding-back in place. This spring is capable of being swung into the position shown in dotted lines, Fig. 2, to permit the introduction and removal of the binding-back and its index-leaves combined therewith.

Thus constructed the file may be used as follows: By swinging the spring S sidewise or slightly raising the same the letter or other sheet may be placed loosely between any two of the index-leaves, when upon turning the spring to its former position, or, if it has been raised, releasing it, its resiliency will cause it to press upon and hold the index-leaves, with the letters or loose sheets filed between them, securely in place. When such a number of letters or loose sheets have been introduced between the index leaves as to fill them to their fullest capacity (it being understood that the projections 1, by which the sheets are held in the binding-back, permit them to separate and expand to a size nearly equal to the height of the sides of the box) the spring S may be swung so as to clear all vertical obstructions to the binding-back, which latter, together with the index leaves combined therewith and their contents, may then be removed bodily, as shown in Fig. 10, and a new binding-back, with its index-leaves combined therewith, introduced into the grooves 6 in the box.

In ordinary business transactions considerable time is consumed in filling one of these files, and therefore, in order to adapt them to receive additions from time to time and permit reference to be readily made to their current contents, as well as to provide their contents with a protection from dust, the top B of the sliding cover may be introduced into the lower grooves, 4, as before explained, and a spring, T, which is pivoted to its end G, placed in the position shown in Fig. 2, where it bears upon the front edges of the index-leaves, holding them in place, as the thickness of the index-leaves is increased by the introduction of filed papers. This spring, so used, is not herein claimed. When this cover is used to close up the box, as shown in Fig. 3, this spring may be swung upon its pivot, so as to occupy the position shown in Fig. 4, where it compresses the index-leaves and prevents the matter filed between them from being disturbed by any movement imparted to the holder, and when so used it is herein claimed.

It is obvious that when the spring T is used the spring S may be omitted and any removable stop to hold the binding-back vertically in place be employed.

It is apparent that the structure of the box may be varied.

As shown in Fig. 6, the box is provided with a bottom, two sides, and a back, with its cover hinged to the back, and with a flap, K, hinged to the bottom, so as to swing down. The grooves 6 in this construction of box are formed by the back and vertical ribs I, fastened to the sides.

Instead of the spring S, a spring, R, attached to the bottom of the cover, may be used, which spring will press down the index-leaves and any matter—such as letters or sheets—between them when the cover closes the box.

The modified form of binding-back shown in Figs. 6 and 7 is an open frame-work, preferably of metal, consisting essentially of top and bottom plates, *m n*, and end plates, *u*, and sheet-supporting rods *t*, which are permanently fastened in place in the plates *m n*. As the papers filed between these index-leaves accumulate they of course raise said leaves upward, and as it is important that the binding or back edges of the leaves shall rise bodily, and not jam or bend at their ends, they may be provided with a stiffening material, not only rendering said edges stiff and rigid, but imparting a strength thereto which will resist any strain that may be exerted upon their points of attachment. In Fig. 8 three examples of this are shown, X representing a strip of wood or similar rigid material attached to each of the index-leaves at the rear of the point of attachment to the rods *t*. *y* illustrates a similar strip perforated by the holes for attaching the index-leaves to the rods *t*. *z* indicates a similar strip placed in front of the holes by which the leaves are attached to the rods *t*. These strips may be secured to these index-leaves in any approved manner. When the set of index-leaves filled with the filed matter and held together by the binding-back is removed bodily from the holder it is important that the free front edges of said leaves shall be secured together. This may be done, of course, by a binding-strap of any form; but it is desirable that the binding-back and the series of index-leaves combined therewith shall comprise in themselves all the necessary adjuncts of their perfect operation, from being held conveniently in the box for the reception of loose papers from time to time to their being removed therefrom and tied or bundled up for storage, as shown in Fig. 10.

We provide a binding cord or band, *e*, which is attached to one of the outer index-leaves by being threaded through the same, and the free ends of this cord or band are temporarily fastened down by any means, (paste at *p*, Fig. 9, being adopted as convenient,) which will prevent them from becoming tangled or interfering with the filing of papers until they are needed for binding up the index-leaves with the filed papers between them. When the binding-back, with the index-leaves combined therewith, is removed from the box the ends of this binding band or cord are detached, and the said band or cord is made to envelop the package about which it is tied, as shown in Fig. 10. One or more of such bands may be employed, although we have shown two in Figs. 9 and 10. As it sometimes occurs that the user of such letter-files desires a different index or requires some change in the one attached to the index-leaves, this letter-file is furnished with a supplementary index, as shown in Fig. 11, temporarily attached to some part of the box or the index-leaves, and gummed upon its back, ready for use.

Having thus described our invention, what we claim as new, and desire to secure by Letters Patent, is—

1. The combination of a binding-back with a series of adjustable index-leaves, and with a box formed with a bottom, two sides, and a back, provided with grooves to receive and retain the said binding-back in said box, and from which it can be removed vertically, substantially as described.

2. A removable binding-back formed with plates *a*, connected together, combined with a series of adjustable index-leaves, each having affixed to its back edge a plate or rod having projections 1, operating in connection with said plates *a*, substantially as described.

3. The combination of a binding-back provided with plates *a*, connected together, with a series of index-leaves, each having affixed to its back edge a plate or rod having projections 1, operating in connection with said plates *a*, with a box having a bottom, two sides, and a back, and provided with grooves for the reception and retention of said binding-back, substantially as described.

4. The combination of a binding-back with a series of adjustable index-leaves, and with a box having a bottom, two sides, and a back, provided with grooves to receive and retain the said binding-back in said box, and from which it can be removed vertically, and with a swinging spring, S, attached to said box so as to bear upon the free ends of said index-leaves to hold them or swing away to release them, substantially as described.

5. The combination, with a box having a bottom, two sides, and a back, of a series of adjustable index-leaves held therein at one end, and a swinging spring, S, constructed so as to bear upon the free ends of said index-leaves to hold them or swing away to release them, substantially as described.

6. The combination of a pivoted spring, T, with the cover, the box A, and a series of index-leaves, substantially as described.

7. A series of index-leaves the outside leaf of which is provided with a binding cord or band, *c*, the free ends of which are temporarily attached thereto and adapted for operation substantially as described.

8. The combination of a cover having a spring, R, attached thereto, with a series of adjustable index-leaves, and a box having a bottom, two sides, and a back, substantially as described.

In testimony whereof we have hereunto set our hands in the presence of two subscribing witnesses.

BLOOMFIELD BROWER.
JOHN F. ADAMS.

Witnesses:
GEO. H. GRAHAM,
E. M. JEROME.